United States Patent
Brilla et al.

(10) Patent No.: US 6,389,276 B1
(45) Date of Patent: May 14, 2002

(54) SYSTEMS AND METHODS FOR PROVIDING VOICE MAIL NOTIFICATION FROM A SEPARATE VOICE MAIL SYSTEM TO MOBILE TELEPHONE

(75) Inventors: Bernard P. Brilla, Pottsville; Ted L. Hoffman, Camp Hill, both of PA (US)

(73) Assignee: Bell Atlantic Mobile, Bedminister, NJ (US)

( * ) Notice: Subject to any disclaimer, the term of this patent is extended or adjusted under 35 U.S.C. 154(b) by 0 days.

(21) Appl. No.: 09/219,302

(22) Filed: Dec. 23, 1998

(51) Int. Cl.⁷ .............................................. H04M 11/10
(52) U.S. Cl. ................... 455/413; 455/560; 379/88.12; 379/68
(58) Field of Search ................................ 455/413, 412, 455/414, 415, 416, 417, 433, 456, 466, 31.2–31.3, 514, 561, 557; 379/67.1, 85, 86, 87, 88.01–88.1, 68, 88.11–88.19, 88.2–88.28

(56) References Cited

U.S. PATENT DOCUMENTS

| | | | |
|---|---|---|---|
| 4,652,700 A | | 3/1987 | Matthews et al. ........ 379/88.26 |
| 4,885,577 A | | 12/1989 | Nelson ................... 340/825.44 |
| 5,008,926 A | | 4/1991 | Misholi .................... 379/88.13 |
| 5,144,648 A | | 9/1992 | Bhagat et al. ......... 340/825.44 |
| 5,177,780 A | * | 1/1993 | Kasper et al. ............... 455/413 |
| 5,193,110 A | | 3/1993 | Jones et al. ............... 379/93.14 |
| 5,313,515 A | * | 5/1994 | Allen et al. .................. 455/413 |
| 5,418,835 A | * | 5/1995 | Frohman et al. ............ 455/413 |
| 5,497,373 A | * | 3/1996 | Hulen et al. ................. 370/259 |
| 5,631,948 A | | 5/1997 | Bartholomew et al. ... 379/88.18 |
| 5,711,011 A | * | 1/1998 | Urs et al. .................... 455/520 |
| 5,740,230 A | * | 4/1998 | Vaudreuil ................ 379/88.22 |
| 5,742,668 A | * | 4/1998 | Pepe et al. ................... 455/415 |
| 5,797,099 A | * | 8/1998 | Ejzak et al. ................ 455/466 |
| 5,802,466 A | * | 9/1998 | Gallant et al. ............... 455/413 |
| 5,835,584 A | * | 11/1998 | Penttonen .................... 379/230 |
| 5,987,317 A | * | 11/1999 | Venturini .................... 455/412 |
| 6,002,750 A | * | 12/1999 | Ertz ......................... 379/88.12 |
| 6,014,559 A | * | 1/2000 | Amin ........................ 455/413 |
| 6,075,860 A | * | 6/2000 | Ketcham ..................... 380/25 |
| 6,061,346 A | * | 8/2000 | Nordman ................... 370/352 |
| 6,097,948 A | * | 8/2000 | Sjodin ........................ 455/426 |
| 6,167,254 A | * | 12/2000 | Chavez, Jr. et al. ........ 455/412 |
| 6,246,871 B1 | * | 6/2001 | Ala-Laurila ................. 455/413 |
| 6,253,061 B1 | * | 6/2001 | Helferich ................... 455/31.2 |

* cited by examiner

*Primary Examiner*—Nay Maung
*Assistant Examiner*—Charles Craver
(74) *Attorney, Agent, or Firm*—McDermott, Will & Emery

(57) ABSTRACT

A system for remote notification of new voicemail messages stored in a landline-based voicemail system to a wireless mobile telephone. A telephone switching system forwards an incoming call for a subscriber's landline telephone or number to a voicemail system for recording voicemail messages. A message platform monitors the generation of a notification request by the voicemail system that typically causes the telephone switching system to illuminate a message waiting indicator on the subscriber's telephone or provide an audible message waiting indication over the subscriber's line. The message platform, in response to detecting the notification request, outputs an e-mail message via a packet switched network (such as the Internet) to a wireless network in communication with a wireless mobile telephone used by the voicemail subscriber. The wireless network, in response to receiving the e-mail message, generates a command for the wireless mobile telephone based on address information supplied in the e-mail message. The command, received by the wireless mobile telephone, causes the wireless mobile telephone to activate a message waiting indicator that notifies the voicemail and wireless mobile telephone subscriber of the new voicemail message at the landline premises.

15 Claims, 4 Drawing Sheets

SYSTEMS AND METHODS FOR PROVIDING VOICE MAIL NOTIFICATION FROM A SEPARATE VOICE MAIL SYSTEM TO MOBILE TELEPHONE

BACKGROUND OF THE INVENTION

1. Technical Field

The present invention relates to switched communications networks providing voice mail services, more particularly to a system and method for notifying mobile wireless subscribers of voice mail messages stored on separate voice mail systems of public or private telephone networks.

2. Background Art

Voice mail has become commonplace not only in business usage but also on an individual telephone service subscriber basis through service from a central office. A voice mail system is a specialized computer that stores messages in digital form on a disk. The voice is generally digitized, usually at a much slower rate than the 64 Kb/s signal the central office uses in its switching network. The digitized voice is compressed and stored on a hard disk that maintains the voice mail operating system, system prompts, and greetings, and the messages themselves. A processor controls the compressing, storing, retrieving, forwarding and purging of files. A comprehensive review of exemplary voice mail systems and voice messaging systems is disclosed in U.S. Pat. No. 5,631,948 to Bartholomew et al., the disclosure of which is incorporated in its entirety herein by reference. While these systems effectively meet the general needs for messaging services, options for notification to subscribers of their waiting messages are not always adequate.

FIG. 1 is a block diagram illustrating an exemplary voice mail implementing communication system, corresponding to FIG. 5 of the above-incorporated Bartholomew et al. patent. As shown in FIG. 1, at least one switching system 10 is connected to a centralized message service voice mail 20. The switching system 10 may be a local or "end office" type telephone central office switch, such as a 1AESS or 5ESS switch sold by American Telephone and Telegraph.

Structurally, the switching system 10 is a standard central office telephone switch. Each subscriber has at least one piece of customer premises equipment, illustrated as telephone station sets 31 to 33. Local telephone lines 35 to 37 serve as communication links between each of the telephone station sets 31 to 33 and the end office switching system 10.

The centralized message service or voice mail system in FIG. 1 comprises voice messaging equipment such as a voice mail system 20. Although referred to as "voice" messaging equipment, equipment 20 may have the capability of storing messages of a variety of different types as well as voice messages. Message service systems having the capability to store messages in a variety of audible, data and image formats are known, see e.g. U.S. Pat. No. 5,193,110 to Jones et al., U.S. Pat. No. 5,008,926 to Misholi and U.S. Pat. No. 4,652,700 to Matthews et al.

The illustrated voice mail system 20 includes a digital switching system (DSS) 21, a master control unit (MCU) 23, a number of voice processing units (VPU's) 25 and a master interface unit (MIU) or concentrator 27. The master control unit (MCU) 23 of the voice mail system 20 is a personal computer type device programmed to control overall operations of the system 20.

An ETHERNET (IEEE 802.3) type digital network 29 carries data signals between the MCU 23 and the voice processing units 25, as well as between the various voice processing units 25. The system 20 further includes T1 type digitized audio links 28 between the DSS switch 21 and each of the voice processing units 25.

The voice mail system 20 connects to the switching system 10 via a number of simplified message desk interface (SMDI) type data lines 41 that connect between one or more data units (not shown) in the end office switching system 10 and the MIU 27. The MIU 27 is a data concentrator which effectively provides a single connection of as many as thirty-two SMDI lines into the MCU 23 of the voice mail system.

The voice mail system 20 also connects to the end office switching system 10 via a number of voice lines 43 which form a multi-line hunt group (MLHG) between the switching system 10 and the DSS switch 21, each carrying 24 voice channels in digital time division multiplexed format.

When the end office switching system 10 forwards a call to the voice mail system 20, the switching system 10 will also provide various forwarding data relating to the forwarded call via one of the SMDI links 41 and the MIU 27, for example which line of the multi-line hunt group 43 that the new call will come in on, the called telephone number and the telephone number of the caller (i.e., calling party). The master control unit 23 uses the multi-line hunt group line information and the subscriber's directory number to internally route the forwarded call though DSS switch 21 and one of the internal T1 links 28 to an available voice processing unit 25 and identifies the relevant subscriber to that voice processing unit via the Ethernet 25.

Hence, the voice mail messaging system 20 is configured for receiving forwarded telephone calls for a called party (e.g., subscriber 31) having subscriber profile information stored in the end office switching system 10. Hence, upon detecting a no answer/busy condition on the corresponding line 37, the end office switching system can forward the incoming call to the MLHG 43 and supply the appropriate information associated with the called party across the SMDI link 41 to internally route the forwarded call to the assigned voice processing unit 25 and to identify the relevant subscriber to the voice processing unit 25.

Each time that the voice mail system 20 stores a new message in a particular subscriber's mailbox, the system 20 will provide a message waiting indication to the end office switching system 10 via the MIU 27 and one of the SMDI links 41. In response to the message waiting signal, the end office switching system 10 sets an appropriate flag in its internal memory associated with that subscriber's line. If the flag is already set, e.g. due to recording of an earlier message, the switching system 10 essentially ignores the latest signal and maintains the on state of the message waiting flag. Subsequently, when someone returns to the subscriber's premises and attempts to initiate a call, the end office switching system 10 will provide a distinctive dial tone, typically an interrupted or "stutter" dial tone, to signify that the subscriber's mailbox contains a new message. The end office switching system 20 may provide a variety of other message waiting indicators, such as a short ring when a person hangs up the telephone to terminate a call at the subscriber's premises.

Similar types of voice messaging systems are found in private networks, such as corporate networks having a private branch exchange. In such instances, a private branch exchange (PBX) processes an incoming call by ringing a telephone having a prescribed extension. If the PBX detects a no answer/busy condition at the extension, the PBX transfers the incoming call to a voice mail platform along with the called party information, enabling the voice mail platform to play a personalized announcement for recording a message.

Once the message is recorded, the voice mail platform sends a message waiting indicator to the PBX specifying the extension has a message. Depending upon the implementation, the PBX will notify the subscriber at the extension of the existence of a message by setting a visual message waiting indicator on the telephone at the subscriber's premises, for example an LED or a flashing LCD symbol, or by generating an audible message waiting indicator such as an interrupted or "stutter" dial tone output by the headset upon detecting an off-hook condition on the extension.

Hence, both public and private telephone networks provide a message waiting indicator at the customer premises corresponding to the dialed number served by the voice mail system. The message waiting indicator may be either a visual indicator physically located on the telephone at the customer premises, or an audible indicator from the handset such as an interrupted dial tone that is generated upon detection of an off-hook condition at the customer premises. Such an arrangement is ineffective, however, in the case where a subscriber is away from the customer premises, i.e., is out of visual range of the telephone. In particular, the visual notification on the telephone can only be detected by the subscriber upon direct visual inspection of the specific telephone. In addition, the audible notification may not be detected until the subscriber actually returns and picks up the handset to place a telephone call.

Hence, a subscriber that is away from the telephone will be unaware of any new messages stored on the voicemail system. This can be a substantial annoyance for a subscriber who cannot always be present at his or her office, but who is still within the same building. The problem is of additional concern to business travelers, who must constantly dial into the voice mail system to check for any new messages, else risk missing an important voice mail message.

Paging systems enable mobile subscribers to be paged by a calling party accessing the paging network. Exemplary paging systems include U.S. Pat. No. 5,144,648 to Bhagat et al. and U.S. Pat. No. 4,885,577 to Nelson, the disclosures of which are incorporated in their entirety herein by reference.

Bhagat et al. discloses a National Satellite Paging System (NSP) capable of processing both numeric and alphanumeric pages and recording voice messages. A calling party accesses the paging system by calling prescribed telephone numbers for a specific paging format. For example a calling party may call a SKYPAGER service for numeric and alphanumeric pages, and a SKYTALK service for recording voice messages. Upon connection with the SKYPAGER or SKYTALK service, the calling party is prompted to enter the personal identification number (PIN) for the mobile subscriber. In response to obtaining the PIN from the calling party, the paging system obtains the subscriber profile information for the mobile subscriber.

If the calling party wishes to record a voice message, the calling party is transferred to a voice mailbox unit that records the message. The voice mailbox unit then establishes a communication link with a central computer configured for processing pages. The voice mailbox informs the central computer in accordance with a Telocator Network Paging Protocol (TNpp) that the mobile subscriber corresponding to the PIN entered by the calling party has a stored message. The central computer updates the subscriber's profile and transmits a page to the mobile subscriber instructing the subscriber to call into SKYTALK and retrieve the message.

The above-described paging systems, however, require that the calling party dial a second communications system that is separate from the original voicemail system if the calling party cannot reach the mobile subscriber at the original customer premises. In other words, a calling party calling a subscriber's office telephone number may reach a voicemail prompt instructing the calling party to either leave a message or page the subscriber at a second pager number. The calling party would then need to disconnect, initiate a second telephone call by dialing the second pager number to access the paging system, and then page the mobile subscriber. Hence, the calling party needs to make two separate phone calls to reach the mobile subscriber, resulting in substantial inconvenience.

Digital wireless cellular and PCS services have implemented integrated voice message and paging systems for mobile subscribers that provide a message waiting indicator on the mobile telephones of the mobile subscribers. Specifically, the digital wireless network includes a mobile telephone switching office (MTSO) for processing wireless calls, and a voicemail system for storing messages by calling parties in the event that the subscriber's digital mobile phone is in use (i.e., busy), in a standby mode (i.e., turned off), or if there is a no answer condition after a predetermined number of rings.

In particular, a calling party calling a mobile subscriber's mobile telephone number is connected to the MTSO serving the mobile telephone number. If the MTSO detects a no answer/busy condition for the subscriber's digital mobile telephone, the MTSO forwards the calling party to the associated voicemail system. The voicemail system plays a personalized greeting established by the subscriber, and records the message.

Once the calling party has recorded the message, the voicemail system sends an instruction to the MTSO to send a message to the digital mobile telephone notifying the mobile subscriber of the voicemail message. If the digital mobile telephone is active, the MTSO sends a page to the digital mobile telephone notifying the subscriber that a call was received. If the digital mobile telephone is inactive (e.g., in standby mode or out of range of the cellular network), the MTSO stores the page until the digital mobile telephone registers with the digital wireless network.

Like the paging system with voice-mail, the above-described cellular systems require a calling party to call a telephone number that is separate from the subscriber's premises in order to page the subscriber. Hence, a calling party attempting to contact the subscriber at the subscriber's office may initially only leave a voicemail message at the subscriber's premises, assuming that the subscriber will reply in a reasonable amount of time. During that time, however, the subscriber away from the office will still be unaware of the stored voicemail message until the calling party either pages the subscriber, or else the subscriber calls into the voicemail system to check for messages.

DISCLOSURE OF THE INVENTION

There is a need for an arrangement that enables subscribers of conventional landline-based voicemail systems configured for receiving transferred incoming calls from telephone switching systems to be notified of messages on the voicemail systems via transmission of notification messages onto a wide area packet switched network. The notification messages can be sent via the wide area packet switched network to a remote destination, such as a mobile telephone.

There is also a need for an arrangement that integrates mobile wireless telephone systems with conventional voicemail systems serving subscribers of conventional telephone switching systems having subscriber telephone lines configured for serving the called party. In particular, there is a need for an arrangement enabling notification of voicemail messages, stored in the subscriber's voice mailbox based on forwarding information from the telephone switching system, to be automatically supplied to the wireless telephone systems.

There is also a need for arrangement for a voicemail system serving a customer premises that initiates a notification message to a separate wireless telephone system, via an open message transport system, in response to storage of a voicemail message.

There is also a need for an arrangement where a mobile unit subscriber, having a voicemail system for storing personalized voicemail messages based on identity information transferred from a telephone switching system serving the called party on a subscriber telephone line, is automatically paged on the corresponding mobile telephone unit in response to a message stored on the voicemail system.

These and other needs are attained by the present invention, where a voicemail system configured for receiving incoming calls and corresponding forwarding data including subscriber line information for a called party from a telephone switching system, includes a message platform for outputting a notification message onto wide area packet switched network in response to storage of a voicemail message for a voicemail subscriber. The message platform includes a translation table that identifies for each voicemail subscriber whether a notification message should be forwarded to a stored destination address. The destination address identifies a network address of a remote location of the voicemail subscriber. In particular, the destination address may identify a destination wireless telephone network to receive the notification message, plus the destination address of the voicemail subscriber within that destination network.

The voicemail system, upon receiving a transferred call and corresponding forwarding data from a telephone switching system, for example a central office switching system or a private branch exchange, connects the transferred call to a voice message platform configured for storing messages for the voicemail subscriber. The voicemail system also uses the forwarding data to initiate playback of a voicemail prompt in the form of a personalized greeting. The voicemail system generates a notification request in response to storage of a voicemail message in the the voicemail system, enabling the telephone switching system to generate a message waiting indicator at the customer premises, for example on the subscriber's telephone.

The message platform also detects the notification request for the voicemail subscriber, and checks its internal translation tables to determine whether the voicemail subscriber has enabled a feature for generation of a notification message to a remote destination.

If the voicemail subscriber has enabled generation of the notification message, the message platform formulates a notification message for transmission to a remote destination using a message destination address stored in the translation table that corresponds to the voicemail subscriber. In particular, the notification message may be sent to a wireless digital telephone network, which generates a command to a wireless telephone used by the voicemail subscriber, enabling the voicemail subscriber to be instantly notified from any location in the wireless service area of the new voicemail message.

According to one embodiment of the present invention, the notification message is output as an electronic mail (e-mail) message output onto a packet switched network, such as the Internet, having a message destination address that includes a network address corresponding to an e-mail server of the wireless network. The wireless network, upon receiving the e-mail message, identifies a wireless destination address in the message destination address, and transmits a command to a mobile telephone unit specified by the wireless destination address. The digital telephone, upon receipt of the command, activates a message waiting indicator indicating receipt of a voicemail message at the landline-based voicemail system.

Hence, the present invention provides an arrangement where a voicemail subscriber on a telephone network, such as a public switched telephone network or a corporate network having a private branch exchange, may be remotely notified of new messages stored in his or voice mail box by the transmission of a notification message to a wireless telephone network in communication with a mobile telephone unit used by the voicemail subscriber.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout and wherein.

BEST MODE FOR CARRYING OUT THE INVENTION

Figure 2:
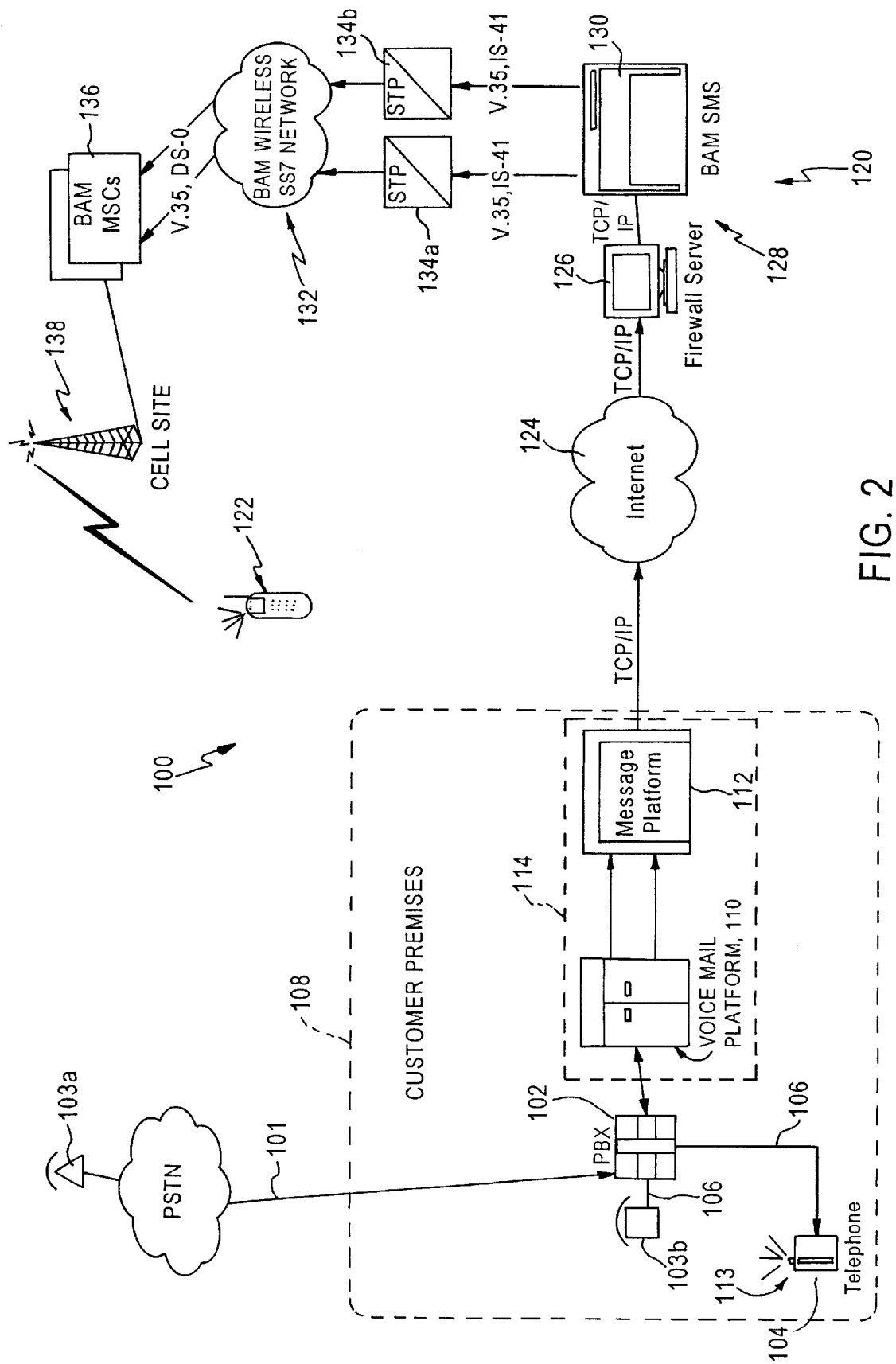
FIG. 2 is a block diagram illustrating a voice mail messaging and notification system according to an embodiment of the present invention.

FIG. 2 is a block diagram illustrating a system 100 for providing voicemail notification from a separate voice mail system to a mobile unit, such as a mobile telephone, according to an embodiment of the present invention. The system 100 is configured for receiving incoming calls initiated by a calling party via a trunk line 101 of a telephone network (e.g., calling party 103*a*), or a local subscriber telephone line in the customer premises 108 (e.g., calling party 103*b*). The system 100 includes a telephone switching system 102 configured for serving a called party telephone 104 on the subscriber telephone line 106. As shown in FIG. 2, the local calling party 103*b* initiates a call to the called party telephone 104 internal to the switch system 102. As shown in FIG. 2, the telephone switching system 102 may be implemented as a private branch exchange (PBX) located at a customer premises 108, such as a corporate or business facility. Alternatively, the telephone switching system 102 may be a central office switching system of a public switched telephone network, for example a local or "end office" type telephone central office switch, such as a 1AESS or 5ESS switch sold by Lucent Technologies.

Figure 1:
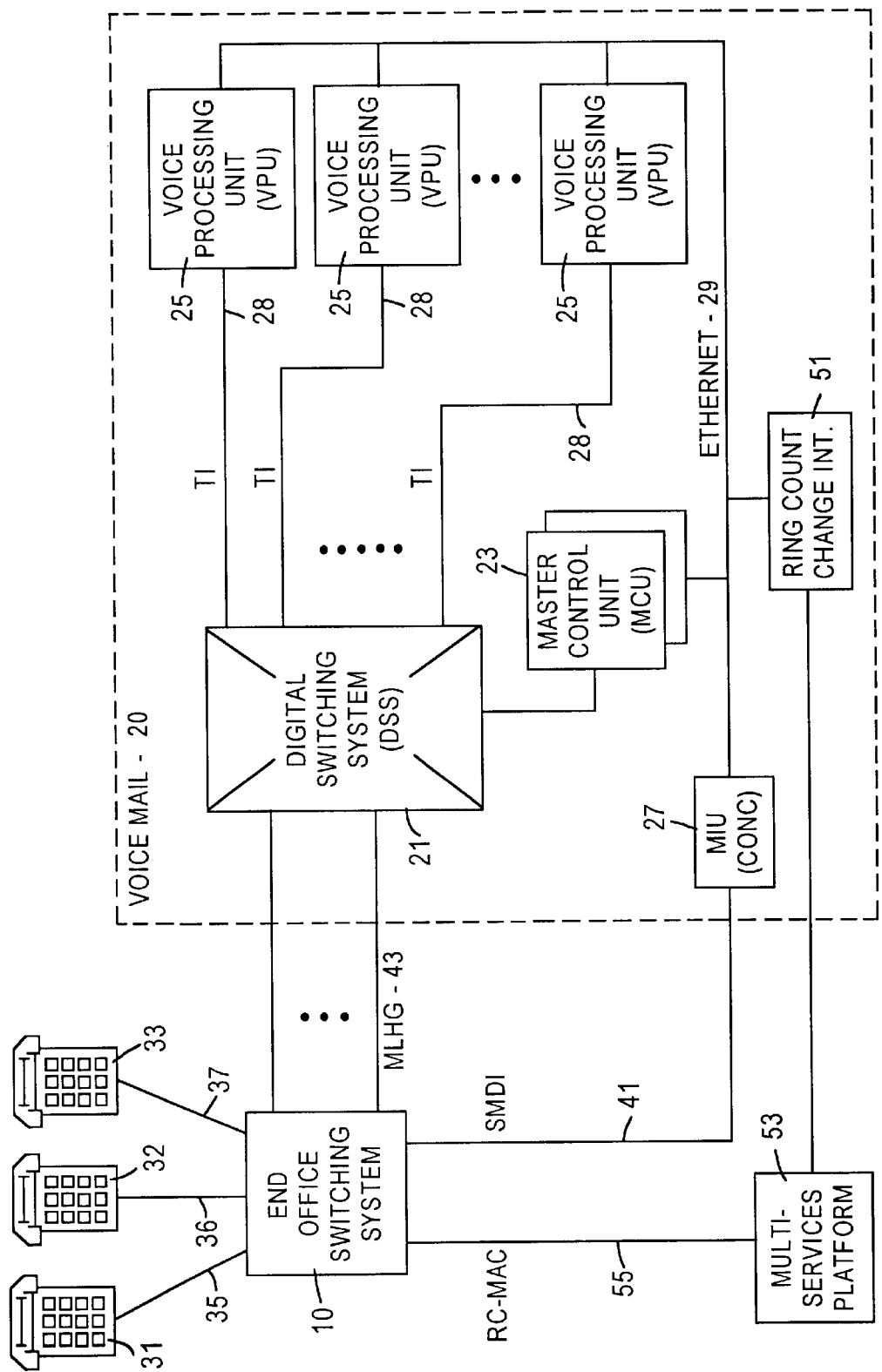
FIG. 1 is a block diagram illustrating a conventional prior art voice mail system.

The system 100 also includes a voicemail system 110 configured for storing voicemail messages for the subscriber of the telephone unit 104. The system maintains a voice mailbox in association with the subscriber's line, station and/or telephone number. In particular, the voicemail system 110 is configured in a manner similar to the voicemail system of FIG. 1, and is configured for receiving a transferred call from the PBX 102. The PBX 102 forwards an incoming call to the voicemail system 110 upon detecting a busy/no answer condition at the premises 104, and supplies signaling information (i.e., forwarding data) identifying the called party premises 104. The forwarding data is used by the voicemail system 110 to initiate a personalized greeting for the calling party, prompting the calling party to record a voicemail message in the subscriber's mailbox.

As recognized in the art, the voicemail system, after recording the voicemail message, disconnects from the calling party and sends a notification request for the called party to the PBX 102. The PBX 102, in response to receiving the notification request, sends a signal to the telephone 104 causing a message waiting indicator 113 to be illuminated on the telephone, either as a light emitting diode, or an LCD display indicating a new message is received. As described above, the message waiting indicator 113 is effective only if the voicemail subscriber is present at the telephone 104. Hence, a telephone user unable to see the message waiting indicator 113 is unaware of the message. This poses problems for voicemail subscribers away from the office. In addition, the conventional inability of voicemail systems to notify voicemail subscribers may be especially frustrating for voicemail subscribers that have a mobile wireless telephone 122 for conducting business away from the office.

The service to the subscriber's telephone 104 is provided via the landline network and the PBX, and that telephone has a landline number and/or extension that callers normally dial. The wireless system 120 operates independently of the landline network, and the subscriber receives independent service at the wireless telephone 122 through the network 120. The subscriber has a second number for the wireless telephone station 122, allowing calls to contact that wireless telephone station 122.

According to the present invention, a message platform 112 is configured for integrating the advantages between a voicemail system 110 at a customer premises 108 and digital wireless telephone systems 120 that enable a user of a digital telephone 122 to receive wireless commands to activate a message waiting indicator on the digital telephone 122 indicating storage of a voicemail message at the voicemail system 110. The message platform 112 is integrated with the voice mail platform 110 in a voice mail system 114 capable of supplying a notification message to the wireless telephone station 122, via the packet switched network 124 and the wireless network 120, indicating storage of a message in the voicemail box corresponding to the subscriber premises 104.

The message platform 112 is configured for generating a notification message to the digital wireless telephone network 120 serving mobile unit 122, where the mobile unit 122 is used by the voicemail subscriber. The message platform 112 detects the notification request sent by the voicemail system 110 to the PBX 102 for illumination of the message waiting indicator 112. Alternately the voicemail platform may send a separate notification request to the message platform 112.

As described below, the message platform 112 includes a translation table that identifies for each voicemail subscriber a destination address for a mobile unit corresponding to the voicemail subscriber. In particular, the destination address includes an e-mail address for the digital cellular system 120 configured for sending command messages to the wireless mobile telephone 122, for example a digital wireless telephone or an analog telephone having cellular digital packet data (CDPD) capabilities. The destination address also includes an address for the wireless mobile telephone 122, such as a mobile telephone number, enabling the digital cellular system 120 to identify the destination of the command message.

Hence, the message platform 112, upon detecting a notification request from the voicemail system 110, determines a wireless destination address for the voicemail subscriber and outputs a message waiting notification to a wireless network for generation of a command to a selected mobile unit having a mobile address specified in the message platform translation table as corresponding to the voicemail subscriber.

As shown in FIG. 2, the digital wireless network 120 includes a network interface 128 including a firewall server 126 and a short message service (SMS) server 130. The firewall server 126 and the SMS 130 together serve as a network interface for a packet switched network 124, such as the Internet. The firewall server 126 provides security for the SMS 130, and limits access to the SMS 130 to authorized incoming traffic such as e-mail having the destination address corresponding to the SMS 130. The SMS 130 communicates with other servers on the packet switched network 124 using a network address that is unique to that server 130. In particular, the message platform 112 takes advantage of the addressing capabilities of Internet Protocol to access the SMS 130 via the firewall server 126.

In simplified fashion the Internet 124 may be viewed as a series of routers connected together with computers connected to the routers. In the addressing scheme of the Internet an address comprises four three-digit numbers separated by dots. An example would be 164.109.211.237. Each machine on the Internet has a unique address which constitutes one set of these four numbers. In the address the leftmost number is the highest number in the Internet hierarchy. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In this example the next number field 211 identifies the destination router. When the packet bearing the destination address leaves the source router the first two numbers are matched in a matrix table to determine how many hops are the minimum to get to the destination. It then sends the packet to the next router as determined from that table and the procedure is repeated. Each router has a database table that finds the information automatically. This continues until the packet arrives at the destination computer. Depending on traffic load, the separate packets that constitute a message may not travel the same path. However they all reach the same destination and are assembled by TCP in their original order. This is in contrast to connection oriented modes such as frame relay and ATM or voice.

The message platform 112 outputs a notification message to the SMS 130 of the digital wireless network 120 via the packet switched network 124 according to a prescribed network protocol such as TCP/IP. In particular, the message platform 122 formulates the destination address for the notification message based on the network address of the SMS 130 specified in the message platform's internal translation table for the voicemail subscriber, and the destination address (e.g., destination mobile telephone number) of the mobile telephone 122 corresponding to the voicemail subscriber. For example, assume the mobile telephone 122 has a mobile telephone number of 703-555-1212 and that SMS 130 accessed via the firewall server 126 has a domain name of "bam.com". The message platform 112 formulates a TCP/IP message including the addressing information "7035551212@message.bam.com" based on voicemail subscriber profile information stored in the message platform 112. The message platform 112 then outputs the TCP/IP e-mail message onto the Internet 124 for reception via the firewall server 126 by SMS 130, which has the Uniform Resource Locator (URL) "www.bam.com/message".

The packet switched network 124 (e.g., the Internet) generates a network address from the URL specified in the e-mail message. In particular, the message platform 112 outputs the message to a predetermined router in the packet switched network 124. The router requests a domain name translation from a domain name server (DNS) accessible by the router within the packet switched network 124. The DNS server provides the translation from the domain or host name supplied by the caller (e.g., the message platform 112) into a complete IP address. Since each site maintains its own domain name server, no single site on the Internet is in possession of all of the translation data. The overall data constitutes a distributed database and relies on the servers at the individual sites. Access to the DNS is through a resolver and software library functions. The function in this case takes a domain name or host name and returns an IP address. The functionality also is capable of providing the inverse function of taking an IP address and returning a host name.

The originating router and its processor interface assemble a TCP/IP packet containing the complete IP address of the destination server 130. The TCP/IP packet containing the contents of the e-mail message then is dispatched through the Internet to the destination gateway router serving the server 130. The destination router then recovers the e-mail message and supplies the recovered e-mail message to the SMS 130 via the firewall server 126.

As shown in FIG. 2, the digital wireless network includes a short message center 130, a signaling network 132 including signaling transfer points 134, a plurality of mobile switching centers (MSCs) 136, and cell site transceivers 138 for transmission of commands to the digital telephone 122.

Figure 3:
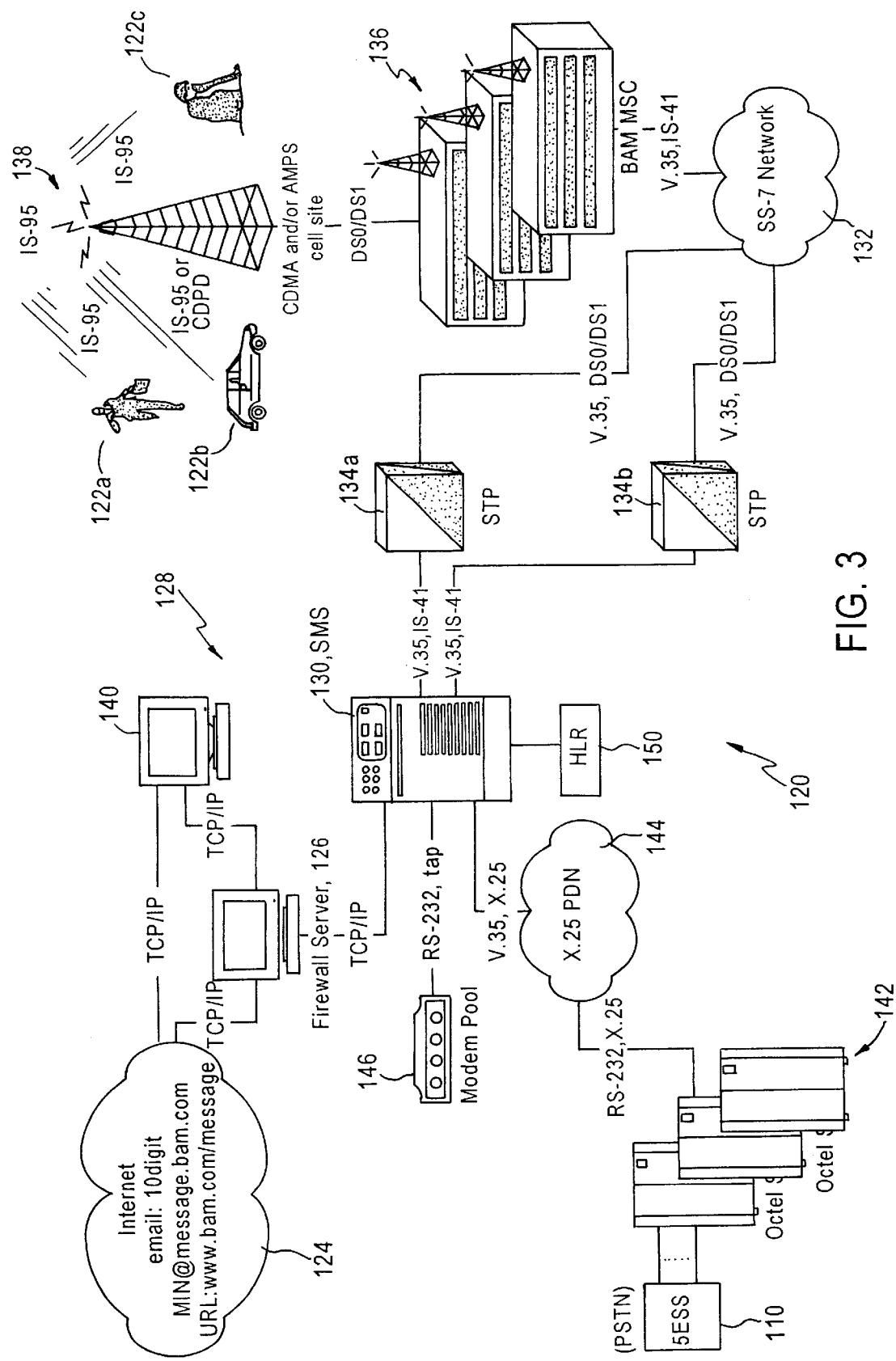
FIG. 3 is a diagram illustrating the wireless network of FIG. 2 used to notify a mobile subscriber of a stored voicemail message according to an embodiment of the present invention.

FIG. 3 is a block diagram illustrating in further detail the digital wireless network of FIG. 2. The short message service (SMS) server 130 of FIGS. 2 and 3 is configured for converting a received notification message from a prescribed messaging protocol, to a prescribed wireless data protocol, such as IS-41. More specifically, the SMS 130 is configured for generating commands to the digital telephone 122 in response to receiving a notification message.

As shown in FIG. 3, the SMS 130 may receive the notification message from numerous sources in addition to the e-mail message via the Internet 124. In particular, the wireless network 120 includes a web server 140, an internal voicemail system 142, an internal packet data network 144, and a modem pool 146 for receiving line-sided connections initiated by personal computer modems.

The web server 140 is configured for generating a web page for the Internet 124, where the web page is output to Internet users specifying the URL of the web page. In particular, a user on the Internet 124 may connect to the web page of the wireless network 120 that is managed by the server 140. The web page supplies a form prompting the user to enter a message for a wireless subscriber. The user enters a mobile identification number (MIN) (e.g., a mobile telephone number) and a message of up to fifty-five (55) characters on the supplied form, and submits the completed form to the web server 140. The web server 140, in response to receiving the completed form from the user via the Internet, executes a Common Gateway Interface (CGI) script that converts the completed form into an e-mail message having a destination "MIN@message.bam.com", where "MIN" represents the mobile identification number and "message/bam.com" is the network address of the SMS 130.

The SMS 130 may also receive a notification message from a calling party that invokes digital numeric paging functions resident in the wireless system 120. In particular, assume that a calling party calls the mobile number of the digital telephone 122 and is transferred to a voicemail system 142 of the wireless network 120 due to a busy/no answer condition of the digital telephone 122. In this case, the calling party invokes digital numeric paging by pressing a predetermined digit during the subscriber's greeting (e.g., by pressing "5"), and entering the numeric page to be sent using DTMF digit entry. The voicemail system 142 of the wireless network then submits a digital page to the SMS 120 via an internal packet data network (PDN) 144. Note that this scenario is distinct from the arrangement of the present invention, where the message platform 112 generates a message in response to storage of the voicemail message in the voicemail platform 110 that is separate and otherwise independent from the wireless system 120.

The SMS 130 may also receive a text message request from a user of a personal computer (PC) that executes text messaging software configured for communications with the SMS 130. In particular, the user generates a text message using the text messaging software, and dials a predetermined telephone number to access a modem pool 146 acting as a landline interface for the SMS 130. The modem pool 146 establishes a connection with the modem of the user's PC, and initiates an RS-232 connection between the user's PC and the SMS 130. The SMS 130 then receives the text message from the user's PC according to Telocator Alphanumeric Protocol (TAP), described below with reference to FIG. 4.

Once the SMS 130 receives the notification message from the firewall server 126, the voicemail system 142, or the user's PC via the modem pool 146, the SMS 130 processes the notification message in order to generate a command for the digital mobile telephone 122. In particular, the wireless network 120 includes a home location register (HLR) 150 that stores subscriber profiles for each of the wireless subscribers and their associated digital wireless telephones 122. As recognized in the art, the HLR 150 stores for each mobile subscriber the subscriber's mobile telephone number, the mobile identification number, and information specifying the wireless services subscribed to by the mobile subscriber, including numeric paging or text-based paging.

The SMS 130, upon receiving a notification message from the firewall server 126, the internal voicemail system 142, or via the modem pool 146, accesses the HLR 150 to determine if the MIN or mobile number specified in the notification message is a valid number of a mobile subscriber that subscribes to wireless paging services. If the SMS 130 determines that the MIN or mobile number specified in the notification message corresponds to a valid mobile subscriber that subscribes to the wireless paging service, the SMS 130 generates a command for the mobile unit 122 corresponding to the MIN or mobile number specified in the notification message. The command generated by the SMS 130 will typically include numeric digits indicating a telephone number to be displayed by the digital telephone 122, or alternately a text-based message supplied by the notification message. Alternately, the command may simply cause the digital telephone 122 to activate a specific message waiting indicator, such as a unique icon on a display or a unique ringing or beep tone.

The SMS 130 outputs the command according to a prescribed signaling protocol, such as an IS-41 message, onto the wireless telephone signaling network 132 for transmission to the mobile telephone 122. The SS7 signaling network 132 forwards the command to the wireless mobile switching center (MSC) 136. The MSC 136 monitors the location of each mobile telephone that is registered in the HLR 150, plus any roaming subscribers that may be registered in a visitor location register (not shown). The MSC 136 locates the cell site 138 serving the mobile telephone 122, and sends the SMS command on a wireless signaling channel, or data channel, to the appropriate cell site 138.

The cell site 138 converts the command into an appropriate wireless data protocol, and transmits the command to the wireless telephone 122 corresponding to the notification message received by the SMS 130. The wireless telephone 122, upon receiving the command from the cell site transceiver 138, displays the message indicating a stored voicemail message, and may beep, ring, or vibrate to alert the mobile subscriber of the incoming command. According to the disclosed embodiment, the command generated based on the e-mail message output by the message platform 112 may include a telephone number or a message, alerting the mobile subscriber that a new voicemail message has been detected by the message platform 112. If the display on the handset 122 has a special icon for the message waiting service, the handset displays that icon in response to the command. Hence, the mobile subscriber can be alerted via his or her mobile telephone 122 of a message stored from an incoming call to his or her landline telephone 104.

According to the preferred embodiment, the command is transmitted by the cell site transceiver 138 according to CDMA protocol IS-95. In particular, CDMA systems have been standardized according to TIA/EIA/IS-95A ("MOBILE STATION-BASE STATION COMPATIBILITY STANDARD FOR DUAL MODE WIDEBAND SPREAD SPECTRUM CELLULAR SYSTEM"—1995), by the Telecommunications Industry Association ("TIA"), the disclosure of which is incorporated in its entirety herein by reference.

With CDMA, each transmitted signal comprises a different pseudorandom binary sequence, also referred to as a pseudonoise (PN) sequence, that modulates a carrier signal, spreading the spectrum of the waveform. Thus, since each CDMA subscriber unit is assigned a unique PN code, a plurality of subscriber stations can send and receive CDMA signals sharing the same frequency spectrum. If these CDMA signals were viewed in either the frequency or time domain, the multiple access signals would appear to be superimposed on top of each other. The CDMA signals are separated in the receivers of the base stations or the subscriber stations by using a correlator which accepts only signal energy from the selected binary PN sequence and despreads its spectrum. The CDMA signals from other sources, whose codes do not match the selected binary PN sequence, are not despread in bandwidth and as a result, contribute only to the background noise and represent a self-interference generated by the system. CDMA interference therefore can be controlled, with the goal of increasing system capacity, on the basis of the reduction in signal-to-noise ratio caused by other users within the cellular CDMA system. Thus, a goal in any CDMA system is to limit the power output of transmitters in order to minimize the cumulative system noise caused by the other users in the CDMA system.

As recognized in the art, the wireless CDMA system may be implemented as a cellular-type system, or a PCS-type system for Personal Communication Services (PCS). A proposed standard for a CDMA PCS system has been submitted by the Joint Technical Committee of the TIA, entitled PN-3384, "PERSONAL STATION-BASE STATION COMPATIBILITY REQUIREMENTS FOR 1.8 TO 2.0 GHz CODE DIVISION MULTIPLE ACCESS (CDMA) PERSONAL COMMUNICATIONS SYSTEMS", Nov. 3, 1994, the disclosure of which is incorporated herein by reference. The PCS proposed standard PN-3384 specifies enhanced services including transmission rates up to 14.4 kbps for enhanced speech quality, full data services at rates up to about 13 kbps, and simultaneous transmission of voice and data. The CDMA PCS system is adapted to operate in any of the licensed PCS frequency allocations from the FCC, currently assigned at 1930–1990 MHz band for the forward CDMA channel (base station to subscriber), and 1850–1910 MHz for the reverse CDMA channel (subscriber to base station).

The forward CDMA channel signals include sixty four (64) code channels. Certain code channels are assigned to different logic channels. For example, code channel 0 is used as a pilot channel, code channels 1–7 are used for either paging channels or traffic channels, and code channel 32 is used as a sync channel or a traffic channel. The remaining code channels are traffic channels. The paging channel, which supports a fixed data rate at 9600, 4800, or 2400 bps, is used for transmission of either control information or pages from the base station to the mobile station. Each paging channel slot has a 200 millisecond interval.

The mobile telephone 122, upon initializing for operation in a CDMA system, acquires the pilot channel of the cell site 138, obtains system configuration and timing information for the CDMA system, and begins monitoring the CDMA paging channels. In particular, the mobile station may perform paging channel monitoring procedures while in an idle state. The mobile station 122 may operate in a slotted mode, where only selected slots (e.g., one or two slots per slot cycle) are monitored on the paging channel. Alternatively, the mobile station 122 may monitor all paging and control channels if operating in a non-slotted mode. In either case, the mobile station 122 monitors the paging and control channels for a command, and transmits an acknowledgement upon receiving any message that is addressed to the mobile station 122.

The digital wireless telephone network 120 may also be implemented as a TDMA (time-division multiple access) system. TDMA systems may be implemented using either the Pan-European digital mobile radio system GSM, DSC1800, PCN (personal communication network), or the North American TDMA (NA-TDMA) digital cellular system known as IS-54. In the case of NA-TDMA, commands can be transmitted on a slot associated control channel (SACCH), which includes twelve code bits present in every time slot transmitted over the traffic channel whether these contain voice or the 260-bit fast associated control channel (FACCH) information.

The above-described transmission of a command to the digital telephone 122 for notification of voicemail messages stored by the voicemail platform 110 may also be implemented in an analog cellular network that supports cellular digital packet data (CDPD) transmissions. In order to appreciate the applicability of the present invention to a CDPD wireless network, a brief description of CDPD operation and systems is necessary.

The use of cellular digital packet data (CDPD) systems is specified in the CDPD specification, Version 1.1 (incorporated herein by reference). Normally, the CDPD communication system shows the same carrier frequencies assigned to the analog voice channels as described in Part 405 of the CDPD specification. Preferably the CDPD system operates most efficiently with an advanced mobile phone system (AMPS).

This is the system authorized by the FCC in 1981 to use 666 cellular radio frequency channels in two bands of frequencies 825 to 845 MHz, and 870 to 890 MHz. The lower half of each band, called the A band, is designated for wire line carriers, which are defined roughly as operating telephone companies. The upper half or B band, is designated for non-wire line carriers, which are the non-telephone company common carriers. The FCC grants licenses in both bands to serve a cellular geographic serving area (CGSA). A CGSA corresponds to a standard metropolitan statistical area (SMSA), which is a major metropolitan area defined by the Office of Management and Budget. The FCC requires that a license application cover 75% of the GCSA's (S surface area within two years of the date of operation). All AMP systems comply with the most recent version of the IS-54 standard.

The typical base unit or mobile data base station (MDBS) (e.g., base station 138) of a CDPD system utilizes a channel within an AMPS cell to establish a link and communicate to a user's wireless subscriber station 122. The MDBS may use other frequencies outside of AMPS that are made available to it by carrier or service providers.

The air interface between the cell site 138 and the mobile unit 122b includes a CDPD control channel and a CDPD data channel. However, the functions of both channels can be carried out on a single CDPD channel. In most cases, the use of a single channel greatly simplifies CDPD operation, thereby providing one of its chief benefits.

Within a CDPD network, digital data is transmitted between the cell site transceiver 138 and the mobile station 122 using Gaussian Minimum Shift Keying (GMSK) modulation.

A CDPD communication system can operate with dedicated channels set aside from the pool of cellular voice channels and reserved for CDPD use. In the alternative, in a more typical mode of operation, the CDPD communication system can use idle time on channels that may also be used by AMPS communications. In this second case, the mobile data base station may perform "RF sniffing" to determine which channels are available and detect the onset of voice traffic on the channel currently being used for CDPD communication. If an AMPS cellular unit begins transmitting on a channel occupied by a CDPD communication, the CDPD unit ceases transmitting on that channel and switches to another available channel (a process called "channel hopping") or if no other channel is available, ceases transmission until a channel becomes available for CDPD use.

Hence, the wireless network 120 of FIG. 3 is configured for receiving a notification message from the Internet 124, and in response transmitting a command to the digital telephone 122 according to a prescribed wireless data protocol, for example CDMA, TDMA, or CDPD.

Figure 4:
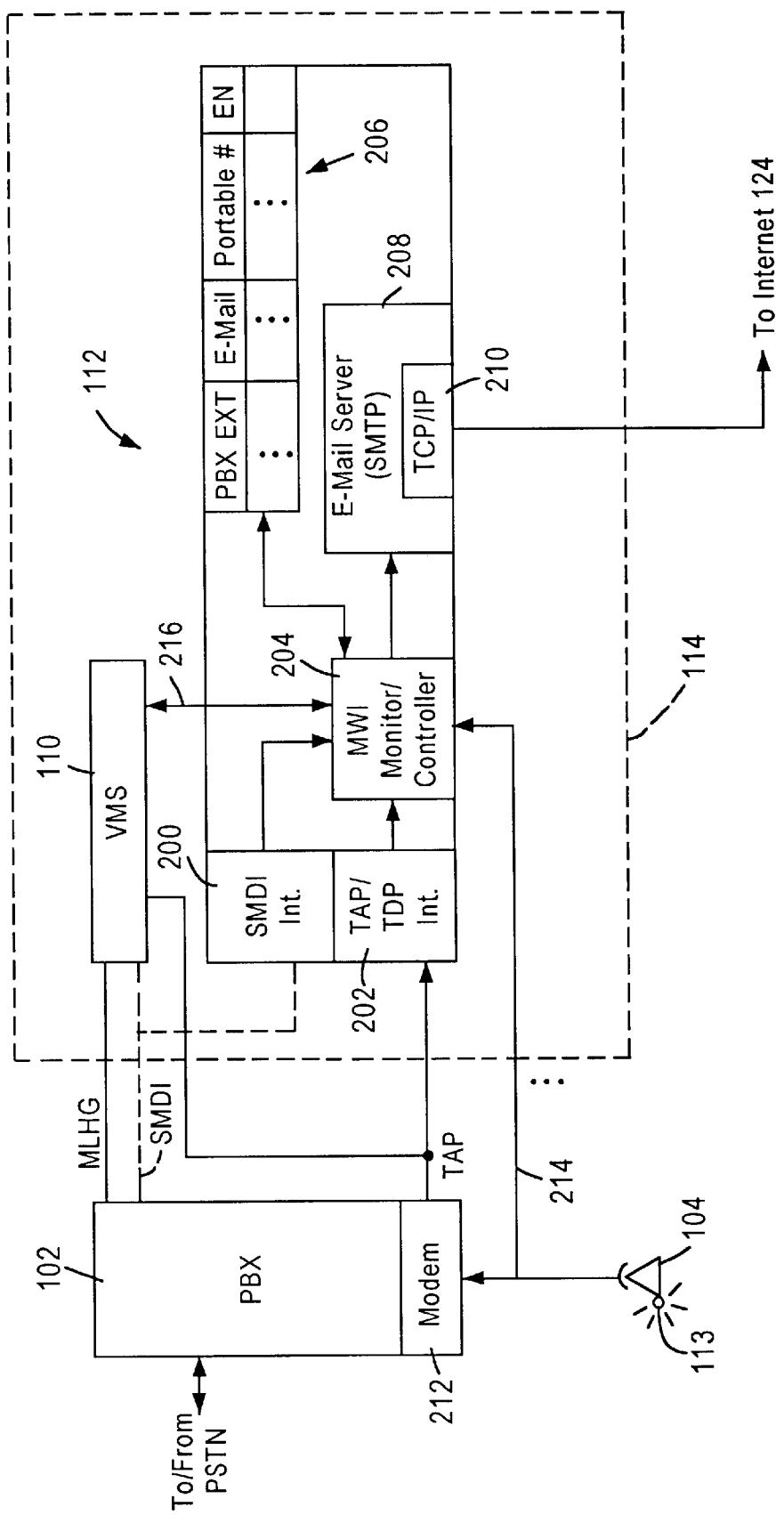
FIG. 4 is a diagram illustrating the voicemail messaging and notification platform according to an embodiment of the present invention.

FIG. 4 is a block diagram illustrating the voicemail system 144 according to an embodiment of the present invention. In particular, FIG. 4 illustrates in detail the interaction of the message platform 112 and the voicemail platform 110. The message platform 112 includes a simplified message desk interface (SMDI) interface platform 200, a TAP/TDP interface 202, a message waiting indicator (MWI) monitor and controller 204 for controlling the message platform 112, a translation table 206, and an SMTP-type e-mail server 208 for sending e-mail messages as notification messages to the SMS 130 via the Internet 124 according to an embodiment of the present invention. The MWI monitor and controller 204 may be a Pentium-based computer having links between the SMDI interface 200, the TAP interface 202, the translation table 206, and the e-mail server 208 according to Ethernet (IEEE 802.3) protocol. Alternately, the message platform 112 may be implemented as a high-end workstation, where the interfaces 200 and 202 are interface cards within the workstation, the table 206 is part of a mass storage unit, and the monitor 204 and the server 208 are executed as part of the distributed processing architecture of the workstation.

As described above, the message platform 112 monitors for the detection of a message waiting indication from the PBX 102 or a notification request from the VMS 100 indicating that a voicemail message has been stored for a VMS subscriber. Depending on the implementation of the VMS 110 and/or the PBX 102, the message platform 112 includes different interfaces capable of detecting the storage of a voicemail message according to different protocols. For example, the SMDI Interface 200 monitors signaling messages between the PBX 102 and the VMS 110 to detect the VMS 110 outputting a notification request for a specified voicemail user. Alternatively, the MWI Monitor 204 may monitor an analog message signaling line 214 for each voicemail subscriber, where the notification request is implemented as an asserted signal on the line 214 that indicates a stored voicemail message for the corresponding subscriber. Alternatively, the TAP/TDP Interface 202 may detect the notification request in the form of a paging signal initiated by a modem 212 in the PBX 102 or the VMS 110 according to the TAP or TDP protocol, described below.

The MWI Monitor and controller 204 interacts with the different interfaces 200 and 202 and/or monitors the message waiting signaling line 214 to determine the storage of a new voicemail message for the voicemail subscriber 104. In response to detecting the storage event, the controller 204 accesses the translation table 206 to determine whether remote notification is necessary. Specifically, the translation table 206 includes for each voicemail subscriber the subscriber's extension or telephone number ("PBX Ext") corresponding to the equipment 104 at the local premises 108, an e-mail address field specifying a destination e-mail network address for the network interface 128, and a portable number field, also referred to as a destination mobile number field, that specifies the destination mobile number for the mobile telephone 122 used by the corresponding voicemail subscriber when away from the office. The translation table also includes for each voicemail subscriber an enable field (EN), that allows the voicemail subscriber to selectively enable and disable the voicemail notification feature as needed.

The voicemail user may access the translation table 206 to program the e-mail, portable #, and enable fields via a provisioning link 216 between the VMS 110 and the MWI controller 204, where the voicemail user enters in the necessary information during an interactive session with a voice response unit in the VMS 110. Alternatively, the table 206 may be programmed by a system administrator, where the voicemail subscriber only has access to set or disable the enable (EN) field.

Operation of the message platform 112 will now be described. A calling party will attempt to call the called party by dialing the PBX extension corresponding to the telephone unit 104 at the customer premises, or by direct dialing the telephone 104 from the public switched telephone network. The PBX 102 will determine the status of the line serving the telephone 104, and transfer the call to the VMS 110 upon determining a busy/no answer condition on the line serving the telephone 104. The PBX 102 will also supplying forwarding data including the called party information (e.g., PBX Extension) to the VMS 110 for the playing of a personalized greeting to prompt the calling party to leave a message.

Once the calling party leaves a message and terminates the connection, the VMS 110 sends a notification request to the PBX 102 via the SMDI link specifying that the voicemail subscriber at the identified extension (PBX Extension) has a new voicemail message. The PBX 102 in response illuminates the message waiting indicator 113 on the telephone 104.

The MWI Controller 204 detects the notification request, either in the form of the SMDI message detected by the SMDI interface 200, or alternately by the assertion of the MWI indicator on line 214. The MWI controller may also detect the new message using a TAP interface 202, where the VMS 110 or the PBX 102 is programmed to send a TAP or TDP protocol paging message in response to the new message. In particular, the TAP paging message is sent to the TAP interface 202, enabling the message platform 112 to generate an e-mail message to the SMS 130 for notification to the digital telephone 122, eliminating the necessity of a separate wireless pager.

The TAP interface 202 receives the TAP paging message output from the modem 212 of the PBX 102 or from the VMS 110, and recovers the PBX Extension information for the MWI controller. A brief overview of the TAP Digital Input Protocol is provided to describe the operations of the TAP/TDP Interface 202.

The Telocator Alphanumeric Protocol (TAP) is the current standard for connecting computers to paging systems. TAP establishes a method for sending 7-bit alphanumeric text to paging receivers, with a block size of 256 characters and an effective message length of 1,000 characters. The Telocator Data Protocol (TDP) suite was adopted as a superset of TAP, and provides a host of new features for wireless computer data transfer.

TAP Protocol is primarily used to forward one or more alphanumeric pages over a single telephone connection. Devices that want to forward page requests use modems to convert computer digital information into a signaling format that can be decoded back into their original format via a modem at the paging terminal. In the case of FIG. 4, the paging terminal is the TAP/TDP Interface 202. The digital information transmitted via modem defines a paging message.

The TAP Protocol consists of three major phases: sign-on phase, transaction phase, and disconnect phase. The speed of the data transmission may vary between 300 to 19,200 bits per second or higher. Transmission normally takes place using seven-bit ASCII data with even parity. All of the alphanumeric data and control characters that are used follow the standard ASCII character set. During the TAP sign-on phase, the paging terminal 202 will await the entry of a carriage return and respond with a prompt to solicit the "sign on" sequence. Several carriage returns may be required before the paging terminal responds. During the sign-on phase, the TAP/TDP interface 202 determines whether an automatic paging input mode is to be used or whether a digital-page manual-entry mode is to be used by the remote device (e.g., the modem 212).

During the transaction phase, the page requests are forwarded by the remote terminal to the paging terminal 202. Each page includes the identification or access number of the "pager" to be alerted, and the text of the message to be displayed. The access number and the text of the message is put into data blocks having 256-byte segments. Each data block includes a checksum to ensure data is transmitted correctly. After accepting or rejecting a received page request, the paging terminal 202 is ready to move on to the next transaction. The calling device (e.g., modem 212) may either send another page request or move to the disconnect phase of the call. The disconnect phase provides a disconnect sequence before disconnecting from the telephone line, ensuring a "clean" method of disconnecting.

Once the TAP/TDP Interface 202 disconnects from the calling device, the interface 202 forwards the access number and text message to the MWI controller 204. The MWI controller 204 in response accesses the translation table 206 to fetch the appropriate e-mail address based on the supplied access number, which may correspond to a number in the PBX Extension field or the Portable Number field, or another miscellaneous field (not shown).

Once the MWI controller 204 obtains the e-mail address and the portable number (if needed) from the translation table 206, the MWI controller 204 generates an e-mail message. The MWI controller 204 includes in the e=mail message an address field that includes the e-mail address and the portable number from the translation table 206, such that the address field recites "<MIN>@message.bam.com", where "<MIN>" represents the portable number, and "message.bam.com" represents the e-mail network address of the network interface 128 of the wireless network 120. The e-mail message also includes a predetermined text message, if none is provided (i.e., if detection is from the interface 200 or the line 214).

After generating the e-mail message, the e-mail message is supplied to the e-mail server 208 for transmission onto the Internet 124. As shown in FIG. 4, the server 208 includes a TCP/IP interface for sending the e-mail message to the SMS 130 according to TCP/IP protocol.

According to the present invention, a message platform determines a storage of a new voicemail message for a subscriber, and in response generates a notification message to a separate wireless network via a packet switched network, such as the Internet. The wireless network, in response to receiving the notification message, generates a command for a selected mobile unit in communication with the wireless network, enabling a mobile subscriber to be notified of the new voicemail message. Hence, a voicemail subscriber can be instantly notified of a voicemail message at his or her home or work. In addition, the transmission of the command to a wireless telephone enables the voicemail/mobile subscriber to instantly access the stored voicemail message from the mobile telephone.

It will be readily apparent that numerous modifications can be made to the disclosed embodiments in accordance with the present invention. For example, the message platform 112, disclosed as separate from the PBX 102 and the voicemail platform 110, may be integrated into either unit by programming the associated controllers. Hence, the functions of the message platform 112 may be incorporated into the PBX 102 or the VMS 100.

In addition, the disclosed embodiments describe the transmission of the e-mail message from the message platform 112 to the wireless telephone 122. If desired, the e-mail message may be sent to an alternate destination, for example a portable laptop PC connected to the Internet 124 at a remote connection, by configuring the e-mail address field of the translation table 206 to specify an Internet Service Provider (ISP) as opposed to the wireless network 120, enabling the voicemail subscriber to obtain voicemail notification via e-mail directly from the Internet in the event that the wireless phone 122 is not in the service area of the wireless network 120 or if the wireless telephone 122 is not usable.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A voicemail system for generating a notification message in response to storage of a voicemail message for a called party, comprising:

a telephone switch interface for receiving a transferred call and corresponding forwarding data from a telephone switch of a telephone network, the telephone switch interface including a signaling link interface for receiving the forwarding data, including signaling information corresponding to subscriber line information for the called party, via a signaling link of a signaling network;

a voice processing unit for initiating a personalized greeting for the called party, and recording a voicemail message supplied by the transferred call, in response to the forwarding data, the voice processing unit outputting a recorded message indicator in response to recording the voice mail message;

a control unit for controlling operations of the voicemail system, the control unit including a table for identifying an e-mail destination address for the called party, the control unit configured for selectively generating a voicemail notification e-mail message for the called party in response to reception of the recorded message indicator; and an e-mail server for outputting the voicemail notification e-mail message to the called party via a packet switched network.

2. The system of claim 1, wherein the signaling link interface is a simplified message desk interface (SMDI) link.

3. The system of claim 2 wherein the e-mail server outputs the voicemail notification e-mail message according to TCP/IP protocol.

4. A system for storing messages, comprising:

a telephone switching system coupled to a subscriber telephone line configured for serving a called party, the telephone switching system configured for executing a transfer of an incoming call for the called party in response to a prescribed condition detected by the telephone switching system;

a voicemail system having a mailbox for initiating a personalized greeting for the called party in response to reception of the transfer of the incoming call and corresponding forwarding data from the telephone switching system, the voicemail system generating and outputting a notification request for the called party in response to storage of a voicemail message for the called party based on the personalized greeting;

a message platform for outputting a notification e-mail message in response to the notification request and according to a prescribed message network protocol, the notification message including a message destination address corresponding to the called party;

a packet data network for transporting the notification message according to the message destination address, wherein the message platform comprises an e-mail server for sending e-mail messages via the packet data network according to a prescribed e-mail protocol; and a wireless network having a network interface for receiving the notification message, the network interface generating a command for a selected mobile unit based on the message destination address, the wireless network in response transmitting the command to the mobile unit indicating the storage of the voicemail message, wherein the network interface includes:

a firewall server for controlling transfer of data from the wireless network, and a short message server for converting the received notification message from the prescribed e-mail protocol to the command according to a prescribed signaling network protocol.

5. The system of claim 4, wherein the packet data network is a TCP/IP based data network.

6. The system of claim 5, wherein the e-mail server generates the voicemail notification e-mail message according to Simple Mail Transfer Protocol (SMTP).

7. The system of claim 5, wherein the message platform further comprises a table for identifying an e-mail destination address for the called party based on a destination mobile number and a network address corresponding to the network interface of the wireless network.

8. The system of claim 7, wherein the mobile number corresponds to a mobile telephone number of a digital wireless telephone system.

9. The system of claim 4, wherein the wireless network is a digital wireless telephone network, and the wireless data protocol is a CDMA wireless telephone protocol, the wireless network further including a mobile switching center configured for causing transmission of the command on a wireless paging signaling channel.

10. The system of claim 4, wherein the wireless data protocol is a cellular digital packet data (CDPD) protocol.

11. The system of claim 4, wherein the e-mail server includes a paging interface for receiving a paging message as the notification request according to a prescribed paging protocol, and the e-mail server generates the voicemail notification e-mail message based on the paging message having the paging protocol.

12. The system of claim 11, wherein the prescribed paging protocol comprises one of Telocator Alphanumeric Input Protocol (TAP) and Telocator Data Protocol (TDP).

13. The system of claim 11, wherein the wireless network is a digital wireless telephone network.

14. The system of claim 4, wherein the telephone switching system executes the transfer in response to detecting one of a no answer condition and a busy condition, on the subscriber telephone line, as said prescribed condition.

15. The system of claim 4, wherein the telephone switching system executes the transfer in response to collecting dialed digits from the incoming call that correspond to a destination telephone number assigned to the subscriber telephone line, the prescribed condition defined by a match between the collected dialed digits and the destination telephone number.

* * * * *